July 12, 1960 R. E. GUNTHER 2,945,167
POWER AMPLIFYING SERVOMECHANISMS
Filed July 31, 1957
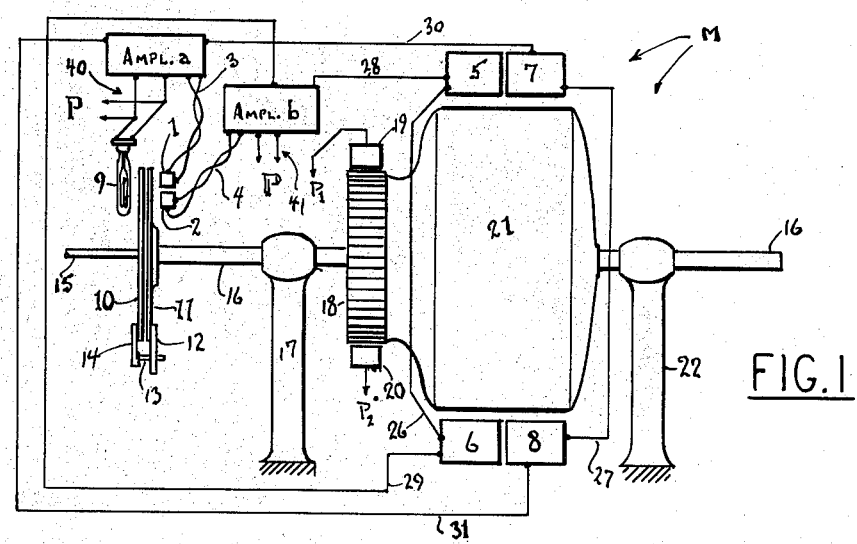
FIG.1
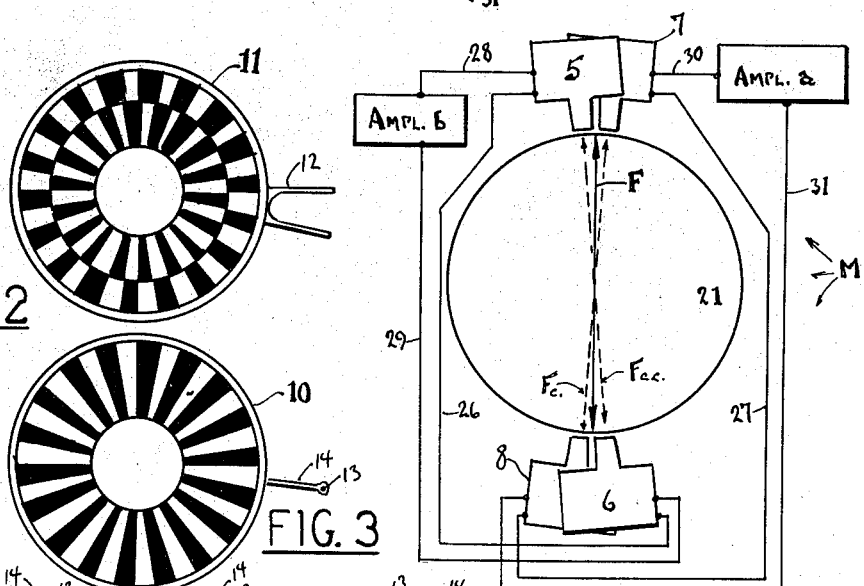
FIG.2
FIG.3
FIG.4
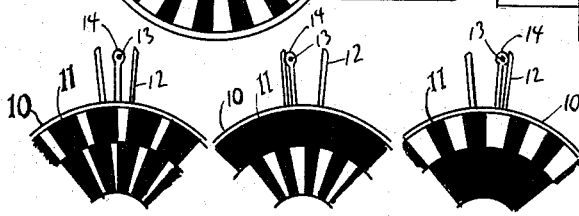
FIG.5  FIG.6  FIG.7
INVENTOR.
Roland E. Gunther

United States Patent Office 2,945,167
Patented July 12, 1960

2,945,167

POWER AMPLIFYING SERVOMECHANISMS

Roland E. Gunther, Cranbury Road,
Princeton Junction, N.J.

Filed July 31, 1957, Ser. No. 675,332

1 Claim. (Cl. 318—28)

Many instruments used today for measuring and indicating various physical parameters have an intrinsically low power output. Where it is desirable to use the response of the instrument for signal feedback or control, or when the indication is to be recorded, it becomes necessary to increase the level of the power available. The maintenance of linearity between the input and the output of the systems involving electronic amplification is beset with some difficulty.

It is an object of this invention to provide a device with which low level mechanical outputs such as may be derived from measuring instruments may be amplified in a manner in which non-linearity in the electronic portion of the amplifier does not distort the relationship between input and output.

It is also an object of this invention to provide a device whereby motion in the input providing instrument at near rest conditions of the latter, when its indicating forces are at a minimum, is virtually unaffected by drag of any type from the power amplifying follower portion of the system.

The manner in which these and other objects are attained may be seen from the following specification and the accompanying drawings.

Figure 1 shows a side view of the essential components of the invention, and their relative positions.

Figure 2 shows one of a pair of optical control elements.

Figure 3 shows another optical control element; the element of Figure 3 and the element of Figure 2 comprise a functional pair.

Figure 4 shows a schematic diagram of magnetic field producing portions of the device.

Figures 5, 6 and 7 all show segmental portions of the optical control elements described in Figures 2 and 3, said elements being in superimposition in Figures 5, 6 and 7. Figure 5 shows the pair of elements in neutral position with respect to one another. Figure 6 shows the relative position of the elements in one extreme of relative angular displacement. Figure 7 shows the elements at the other extreme of relative angular displacement, opposite to that of Figure 6.

In the drawings, Figure 1 shows a side view of the preferred form of the device. Shown in the figure is a rotary input shaft end 15, which may comprise the indicating portion of an instrument such as a voltmeter, ammeter or other similar device, not shown further in the drawing. Mounted on input shaft 15 is an essentially transparent disc 10; disc 10 carries an arm 14 in which in turn is affixed a motion limiting pin 13 extending in a line parallel to the axis of shaft 15. Axially aligned with input shaft 15 is a main output shaft 16, and output shaft 16 is rotatably supported on a pair of journalled supports 17 and 22.

Parallel and adjacent to disc 10 and mounted on main shaft 16 in axially centered manner is another essentially transparent disc 11. Disc 11 carries a fork 12 which brackets pin 13.

On one side of the disc pair 10 and 11 is a source of illumination 9, and on the side of the disc pair opposite the source of illumination 9 is a pair of light sensitive elements 1 and 2, the cells 1 and 2 being radially aligned with respect to the shafts 15 and 16.

Indicated in Figure 1 also are two amplifiers, denoted by the rectangles marked "Ampl. a" and "Ampl. b," with a lead pair 3 connecting the output of light sensitive element 1 with the input of amplifier a, and another lead pair 4 connecting the output of light sensitive element 2 with the input of amplifier b. An appropriate wiring network 40 connects amplifier a and the light source 9 with a suitable power source denoted by the letter P, and a similar connection is made by connections 41 with the power source P, not actually shown by symbol.

Figure 1 also shows an electromotor type group of components indicated by the letter M, comprising an armature 21 and an associated commutator 18 as well as a brush pair 19 and 20 contacting the commutator 18; the group also includes motor fields, differing from conventional ones in consisting of closely proximate split field windings 5, 6 and 7, 8, angularly slightly separated.

Power is supplied to the armature 21 via commutator 18 through brush 19 by means of a sub-connection $P_1$ to the power source and through brush 20 by sub-connection $P_2$ to the power source. The field winding set 5, 6 are energised by the output of amplifier b, feeding through 28 and 29, with connecting wire 26 between the windings 5 and 6 completing the circuit. Field windings 7, 8 are energised by the output of amplifier a feeding through a pair of windings 30, 31 with interconnecting wire 27 between the field windings 7, 8 completing the circuit.

Figure 2 shows a frontal view of the disc 11 previously mentioned under the description of Figure 1. In the view in Figure 2 is shown the fact that the disc 11 has two concentric bands of alternating opaque and transparent radially extending stripes of equal width measured angularly, thus comprising radial versions of Ronchi rulings. The opaque stripes in one of the bands on disc 11 are aligned with the transparent stripes on the other band, and the widths of the two bands are so taken that the total areas covered by the two bands is substantially equal.

Also shown in Figure 2 is the previously mentioned fork 12.

Figure 3 shows a frontal view of disc 10 also mentioned in the description of Figure 1. Disc 10 is shown in this view to bear a single radial Ronchi type grid ruling, the elements of the ruling on disc 10 being of the same angular width as those on disc 11 of Figure 2.

In Figure 3 there is also shown the rod 14 and the end of the pin 13 named under the description of Figure 1.

Figure 4 shows a view of the motor portion M mentioned under Figure 1 taken generally in a plane perpendicular to the axis of the device. Shown again in Figure 4 are the field winding sets 5, 6 and 7, 8 with the angular displacement between the sets made visible in this view. The connections making up the circuit: field windings 7, 8 leads 30, 31, amplifier a and connector 27 are again shown, as are those making up the circuit: field set 5, 6, leads 28, 29, amplifier b and connecting wire 26.

An arrow F is shown in Figure 4 also to indicate the alignment of the armature field with respect to the field winding sets 5, 6 and 7, 8 at the condition of balance, namely in a line between the two field sets. A dotted arrow Fcc shows the alignment into which the armature field is subject to being moved when only the field set 5, 6 is energised; dotted arrow Fc shows the alignment into which the armature field is drawn when only the field winding set 7, 8 is energised.

Figure 5 shows sections of discs 10 and 11 in superimposition as they would appear to an observer looking in line with the axis of the shafts 15 and 16 of Figure 1. This figure shows the relative position of the gratings on discs 11 and 10 in a condition of balance of the device, wherein the uniform opaque stripes on disc 10 cover half of the transparent stripes in both inner and outside bands of disc 11, and pin 13 is centrally located between the two tines of the fork 12.

Figure 6 shows a view of the superimposed discs 10 and 11 taken from a similar vantage point as in Figure 5 and illustrates the relative position of the gratings on discs 10 and 11 at the condition in which the input carried disc 10 has been displaced a maximum amount in counterclockwise direction as permitted by pin 13 within the tines of the fork 12. In these circumstances the radially extending grid lines on disc 10 are shown to be coincident with the transparent stripes of the outer band of disc 11 thereby acting as a shutter over this portion of disc 11, and uncovering completely at the same time the transparent stripes of the inner band on disc 11 permitting light to pass through this portion of disc 11.

Figure 7 shows a view similar to those described in Figures 5 and 6 as to view point, but with disc 10 displaced the furthest possible in clockwise direction with respect to disc 11 that is permitted by pin 13 in fork 12. With this angular displacement the outer band of disc 11 has its transparent portion uncovered by the grid of disc 10 thereby permitting light to pass through this portion, while at the same time shutting off the inner band of disc 11.

The manner in which the device operates is as follows:

The device is made ready by energisation of the light source 9 and the amplifiers a and b from the power source P and current being supplied to the armature 21 via the brushes 19, 20 on commutator 18 through lead subconnections $P_1$ and $P_2$. The photosensitive element 1 is aligned with the outer band of stripes on disc 11 and the light source 9 and the element 2 is brought in line with the light source 9 and the inner band of disc 11. Whatever light is permitted to pass through the outer band of disc 11 falls on element 1 signalling a response to amplifier a, which is fed in amplified form to the field coil set 7, 8. Light passing through the inner band of disc 11 falls on element 2, whose output is amplified by amplifier b and fed then into field coil set 5, 6 in amplified form.

The balanced condition between the input shaft 15 and the output shaft 16 is shown in Figure 5 in the relationship between the gratings on disc 10 and disc 11 associated with the input and the output shafts respectively. In the condition of balance as shown in Figure 5 the grating lines of disc 10 are so disposed with respect to the lines of the outer band of disc 11 as to leave them half uncovered and so disposed with respect to the inner band lines as to leave them half uncovered also. The areas covered by the bands being substantially equal, the amounts of light falling on photoelements 1 and 2 are substantially the same. The amplifiers a and b having substantially the same gain, it follows that their outputs, fed into field coil sets 7, 8 and 5, 6 respectively are also substantially the same at balance. Under these conditions the armature field indicated by the line F in Figure 4 will be drawn equally by the external fields and be maintained in a line passing essentially in the middle between the two field sets, as shown in Figure 4.

When the input shaft is rotated in counterclockwise direction the discs 10 and 11 will have a respective position shown in Figure 6, in which case the grating lines of disc 10 uncover the transparent portions of the inner band of disc 11. This is accompanied by a shutting off of the transparent portion of the outer band of disc 11, and consequently amplifier b receives a strong signal and produces a high output to field 5, 6 while amplifier a receives practically no signal and delivers a minimum of output to field 7, 8; the result shows itself in a shift in the external field acting on the armature 21 and the creation of a condition between the external field and armature, in conjunction with the commutating system that comprises the elements of an electric motor so that the armature is brought into counterclockwise rotation. The disc 11 being associated with the armature through the shaft 16, it also rotates in counterclockwise direction, thereby following the lead of the disc 10. When the output shaft 16 has rotated sufficiently in following the rotation of shaft 15 to catch up with it, the balance relationship between discs 10 and 11 is again reestablished and the field strengths in the sets 5, 6 and 7, 8 are also once more caused to become substantially equal, and therefore the armature also comes to rest again with its field in alignement between the two external fields. An overshoot in armature movement in the counterclockwise direction or an excursion of the input shaft in the clockwise direction brings about the condition of discs 10 and 11 shown in Figure 7 with a consequent rotation of the armature in a clockwise direction until the conditions of balance described are again established.

It can be seen from the above that motion required by the input to bring the output into response can be brought about with very small forces, since they need only rotate the disc 10, and the use of amplifiers permits a substantial load to be put on the output shaft 16. The light sensitive elements that can be used in the construction are many and varied, and the availability of such small elements as phototransistors and even smaller lead sulphide elements permits the discs 10 and 11 to be made of extremely small dimensions, which in turn lowers the power requirements for the input.

The device has an advantage in addition to its uncritical demands with respect to linearity of amplifier response, namely the fact that even the amounts of gain produced by the amplifiers need not be matched too critically, since the device goes from balance condition to balance condition, and providing that the readout is brought to null before making a reading, the difference in field strengths between the field sets 5, 6 and 7, 8 if any exists cancels out.

I claim:

In a power amplifying servomechanism the combination of a mechanical input means, a mechanical output means, an electromotive means, said electromotive means connected to said output means, said electromotive means comprising a forward-motion producing section and a reverse-motion producing section, a light source, a primary electrically responsive light sensitive element, a primary electrical amplifying means, said primary electrical amplifying means connected between said primary light sensitive element and said forward-motion producing section of said electromotive means, a secondary electrically responsive light sensitive element, said secondary light sensitive element being essentially identical with said primary light sensitive element, a secondary electrical amplifying means, said secondary electrical amplifying means being essentially identical with said primary electrical amplifying means, said secondary electrical amplifying means connected between said secondary light sensitive element and said reverse-motion producing section of said electromotive means, two similar shutter means, each of said shutter means comprising a pair of identical superimposed Ronchi rulings, said rulings in each of said pair of rulings being laterally displaceable with respect to each other, a motion limiting means, said motion limiting means limiting lateral displacement between said superimposed pairs of rulings to a distance equal to the width of one line of said rulings, one ruling in each said pair of rulings being laterally movable by said input means, the other ruling of each said pair of rulings being laterally movable by said output means, each of said shutter means being in condition of maximum opening when lines of both of a said pair of superimposed rulings are in coincidence, and each of said shutter means being in closed condition when the lines of one of a said pair of superimposed rulings are coincident with the spaces between the lines of the other of said pair of rulings, one of said shutter means being here designated as primary, said primary shutter means being interposed between said light source and said primary light sensitive element, said primary shutter means being openable by relative forward motion of said input with respect to said output, the other of said two shutter means being here designated as secondary, said secondary shutter means being interposed between said light source and said secondary light sensitive element, and said secondary shutter means being openable by relative forward movement of said output with respect to said input.

References Cited in the file of this patent

UNITED STATES PATENTS

| | | |
|---|---|---|
| 2,127,265 | Martin | Aug. 16, 1938 |
| 2,167,484 | Berry | July 25, 1939 |
| 2,319,212 | Cooley | May 18, 1943 |
| 2,686,282 | Salamonvich | Aug. 10, 1954 |
| 2,715,707 | Haskins | Aug. 16, 1955 |

FOREIGN PATENTS

| | | |
|---|---|---|
| 315,921 | Switzerland | Oct. 31, 1956 |